(12) United States Patent
Morrison

(10) Patent No.: US 10,345,596 B2
(45) Date of Patent: Jul. 9, 2019

(54) SYSTEMS, DEVICES, AND METHODS FOR ASTIGMATISM COMPENSATION IN A WEARABLE HEADS-UP DISPLAY

(71) Applicant: THALMIC LABS INC., Kitchener (CA)

(72) Inventor: Vance R. Morrison, Kitchener (CA)

(73) Assignee: North Inc., Kitchener, ON (CA)

( * ) Notice: Subject to any disclaimer, the term of this patent is extended or adjusted under 35 U.S.C. 154(b) by 0 days.

(21) Appl. No.: 15/809,247

(22) Filed: Nov. 10, 2017

(65) Prior Publication Data

US 2018/0129053 A1 May 10, 2018

Related U.S. Application Data

(60) Provisional application No. 62/420,368, filed on Nov. 10, 2016.

(51) Int. Cl.
*G02B 13/08* (2006.01)
*G02B 27/01* (2006.01)
*G02B 27/09* (2006.01)

(52) U.S. Cl.
CPC ...... *G02B 27/0172* (2013.01); *G02B 27/0911* (2013.01); *G02B 27/0966* (2013.01); *G02B 27/0972* (2013.01); *G02B 2027/011* (2013.01); *G02B 2027/013* (2013.01); *G02B 2027/0147* (2013.01); *G02B 2027/0174* (2013.01); *G02B 2027/0178* (2013.01)

(58) Field of Classification Search
CPC combination set(s) only.
See application file for complete search history.

(56) References Cited

U.S. PATENT DOCUMENTS 3,408,133 A 10/1968 Lee
3,712,716 A 1/1973 Cornsweet et al.
(Continued)

FOREIGN PATENT DOCUMENTS

JP 61-198892 A 9/1986
JP 10-319240 A 12/1998
(Continued)

OTHER PUBLICATIONS

Amitai, "P-27: A Two-dimensional Aperture Expander for Ultra-Compact, High-Performance Head-Worn Displays," *SID Symposium Digest of Technical Papers*, vol. 36, No. 1 (2005), pp. 360-363.
(Continued)

*Primary Examiner* — Ryan D Howard
(74) *Attorney, Agent, or Firm* — Thomas Mahon

(57) ABSTRACT

Systems, devices, and methods for preventing image astigmatism in wearable heads-up displays (WHUD) with laser projectors are described. A WHUD includes a support structure carrying a laser projector and an eyeglass lens with a transparent combiner. The laser projector includes at least one laser diode, at least one anamorphic optical element, and at least one controllable mirror. The at least one laser diode generates a laser light that, without optical manipulation, would result in an astigmatic, unfocused image at the eye of the user. The at least one anamorphic optical element anamorphically shapes the spot of the laser light to compensate for an astigmatic effect of at least the transparent combiner. The at least one controllable mirror scans the light onto the transparent combiner and the transparent combiner redirects the light towards an eye of a user to create a focused, non-astigmatic image.

7 Claims, 3 Drawing Sheets

(56) References Cited

U.S. PATENT DOCUMENTS

| | | |
|---|---|---|
| 4,978,213 A | 12/1990 | El Hage |
| 5,103,323 A | 4/1992 | Magarinos et al. |
| 5,231,674 A | 7/1993 | Cleveland et al. |
| 5,467,104 A | 11/1995 | Furness, III et al. |
| 5,589,956 A | 12/1996 | Morishima et al. |
| 5,596,339 A | 1/1997 | Furness, III et al. |
| 5,742,421 A | 4/1998 | Wells et al. |
| 6,008,781 A | 12/1999 | Furness, III et al. |
| 6,027,216 A | 2/2000 | Guyton et al. |
| 6,184,847 B1 | 2/2001 | Fateh et al. |
| 6,204,829 B1 | 3/2001 | Tidwell |
| 6,236,476 B1 | 5/2001 | Son et al. |
| 6,317,103 B1 | 11/2001 | Furness, III et al. |
| 6,353,503 B1 | 3/2002 | Spitzer et al. |
| 6,377,277 B1 | 4/2002 | Yamamoto |
| 6,639,570 B2 | 10/2003 | Furness, III et al. |
| 6,972,734 B1 | 12/2005 | Ohshima et al. |
| 7,473,888 B2 | 1/2009 | Wine et al. |
| 7,640,007 B2 | 12/2009 | Chen et al. |
| 7,684,105 B2 | 3/2010 | Lamontagne et al. |
| 7,747,113 B2 | 6/2010 | Mukawa et al. |
| 7,773,111 B2 | 8/2010 | Cleveland et al. |
| 7,850,306 B2 | 12/2010 | Uusitalo et al. |
| 7,925,100 B2 | 4/2011 | Howell et al. |
| 7,927,522 B2 | 4/2011 | Hsu |
| 8,120,828 B2 | 2/2012 | Schwerdtner |
| 8,179,604 B1 | 5/2012 | Prada Gomez et al. |
| 8,188,937 B1 | 5/2012 | Amafuji et al. |
| 8,355,671 B2 | 1/2013 | Kramer et al. |
| 8,560,976 B1 | 10/2013 | Kim |
| 8,634,119 B2 | 1/2014 | Bablumyan et al. |
| 8,666,212 B1 | 3/2014 | Amirparviz |
| 8,704,882 B2 | 4/2014 | Turner |
| 8,922,481 B1 | 12/2014 | Kauffmann et al. |
| 8,922,898 B2 | 12/2014 | Legerton et al. |
| 8,970,571 B1 | 3/2015 | Wong et al. |
| 8,971,023 B2 | 3/2015 | Olsson et al. |
| 9,086,687 B2 | 7/2015 | Park et al. |
| 9,135,708 B2 | 9/2015 | Ebisawa |
| 9,477,079 B2 | 10/2016 | Bailey et al. |
| 9,766,449 B2 | 9/2017 | Bailey et al. |
| 2001/0033402 A1 | 10/2001 | Popovich |
| 2002/0003627 A1 | 1/2002 | Rieder |
| 2002/0007118 A1 | 1/2002 | Adachi et al. |
| 2002/0030636 A1 | 3/2002 | Richards |
| 2002/0063975 A1* | 5/2002 | Kelly .............. G02B 5/06 359/832 |
| 2002/0093701 A1 | 7/2002 | Zhang et al. |
| 2002/0120916 A1 | 8/2002 | Snider, Jr. |
| 2004/0174287 A1 | 9/2004 | Deak |
| 2005/0012715 A1 | 1/2005 | Ford |
| 2006/0238707 A1 | 10/2006 | Elvesjo et al. |
| 2007/0078308 A1 | 4/2007 | Daly |
| 2007/0132785 A1 | 6/2007 | Ebersole et al. |
| 2009/0109241 A1 | 4/2009 | Tsujimoto |
| 2009/0179824 A1 | 7/2009 | Tsujimoto et al. |
| 2009/0207464 A1 | 8/2009 | Wiltshire et al. |
| 2009/0258669 A1 | 10/2009 | Nie et al. |
| 2009/0322653 A1 | 12/2009 | Putilin et al. |
| 2010/0053555 A1 | 3/2010 | Enriquez et al. |
| 2010/0060551 A1 | 3/2010 | Sugiyama et al. |
| 2010/0142015 A1 | 6/2010 | Kuwahara et al. |
| 2010/0149073 A1 | 6/2010 | Chaum et al. |
| 2010/0150415 A1 | 6/2010 | Atkinson et al. |
| 2010/0239776 A1 | 9/2010 | Yajima et al. |
| 2012/0002256 A1 | 1/2012 | Lacoste et al. |
| 2012/0139817 A1 | 6/2012 | Freeman |
| 2012/0169752 A1 | 7/2012 | Kurozuka |
| 2012/0182309 A1 | 7/2012 | Griffin et al. |
| 2012/0188158 A1 | 7/2012 | Tan et al. |
| 2012/0249797 A1 | 10/2012 | Haddick et al. |
| 2012/0290401 A1 | 11/2012 | Neven |
| 2012/0302289 A1 | 11/2012 | Kang |
| 2013/0009853 A1 | 1/2013 | Hesselink et al. |
| 2013/0016292 A1 | 1/2013 | Miao et al. |
| 2013/0016413 A1 | 1/2013 | Saeedi et al. |
| 2013/0050669 A1* | 2/2013 | Maeda .............. B41J 2/465 355/67 |
| 2013/0088413 A1 | 4/2013 | Raffle et al. |
| 2013/0135722 A1 | 5/2013 | Yokoyama |
| 2013/0165813 A1 | 6/2013 | Chang et al. |
| 2013/0169560 A1 | 7/2013 | Cederlund et al. |
| 2013/0198694 A1 | 8/2013 | Rahman et al. |
| 2013/0215235 A1 | 8/2013 | Russell |
| 2013/0222384 A1 | 8/2013 | Futterer |
| 2013/0265437 A1 | 10/2013 | Thörn et al. |
| 2013/0285901 A1 | 10/2013 | Lee et al. |
| 2013/0300652 A1 | 11/2013 | Raffle et al. |
| 2013/0332196 A1 | 12/2013 | Pinsker |
| 2013/0335302 A1 | 12/2013 | Crane et al. |
| 2014/0045547 A1 | 2/2014 | Singamsetty et al. |
| 2014/0125760 A1 | 5/2014 | Au et al. |
| 2014/0198034 A1 | 7/2014 | Bailey et al. |
| 2014/0198035 A1 | 7/2014 | Bailey et al. |
| 2014/0202643 A1 | 7/2014 | Hikmet et al. |
| 2014/0204455 A1 | 7/2014 | Popovich et al. |
| 2014/0204465 A1 | 7/2014 | Yamaguchi |
| 2014/0226193 A1 | 8/2014 | Sun |
| 2014/0232651 A1 | 8/2014 | Kress et al. |
| 2014/0285429 A1 | 9/2014 | Simmons |
| 2014/0368896 A1 | 12/2014 | Nakazono et al. |
| 2015/0036221 A1* | 2/2015 | Stephenson ........ G02B 27/0101 359/630 |
| 2015/0156716 A1 | 6/2015 | Raffle et al. |
| 2015/0205126 A1 | 7/2015 | Schowengerdt |
| 2015/0205134 A1 | 7/2015 | Bailey et al. |
| 2015/0268821 A1 | 9/2015 | Ramsby et al. |
| 2015/0279114 A1* | 10/2015 | Yonekubo ............ G02B 6/0031 345/633 |
| 2015/0325202 A1 | 11/2015 | Lake et al. |
| 2015/0362734 A1 | 12/2015 | Moser et al. |
| 2015/0378162 A1 | 12/2015 | Bailey et al. |
| 2016/0033771 A1 | 2/2016 | Tremblay et al. |
| 2016/0202081 A1 | 7/2016 | Debieuvre et al. |
| 2016/0238845 A1 | 8/2016 | Alexander et al. |
| 2016/0274365 A1 | 9/2016 | Bailey et al. |
| 2016/0274758 A1 | 9/2016 | Bailey |
| 2016/0327796 A1 | 11/2016 | Bailey et al. |
| 2016/0327797 A1 | 11/2016 | Bailey et al. |
| 2016/0349514 A1 | 12/2016 | Alexander et al. |
| 2016/0349515 A1 | 12/2016 | Alexander et al. |
| 2016/0349516 A1 | 12/2016 | Alexander et al. |
| 2016/0377865 A1 | 12/2016 | Alexander et al. |
| 2016/0377866 A1 | 12/2016 | Alexander et al. |
| 2017/0068095 A1 | 3/2017 | Holland et al. |
| 2017/0097753 A1 | 4/2017 | Bailey et al. |
| 2017/0115483 A1 | 4/2017 | Aleem et al. |
| 2017/0153701 A1 | 6/2017 | Mahon et al. |
| 2017/0205876 A1 | 7/2017 | Vidal et al. |
| 2017/0212290 A1 | 7/2017 | Alexander et al. |
| 2017/0212349 A1 | 7/2017 | Bailey et al. |
| 2017/0219829 A1 | 8/2017 | Bailey |
| 2017/0299956 A1 | 10/2017 | Holland et al. |
| 2017/0343796 A1 | 11/2017 | Bailey et al. |
| 2017/0343797 A1 | 11/2017 | Bailey et al. |
| 2018/0007255 A1 | 1/2018 | Tang |

FOREIGN PATENT DOCUMENTS

| | | |
|---|---|---|
| JP | 2013-127489 A | 6/2013 |
| JP | 2013-160905 A | 8/2013 |
| KR | 10-2004-0006609 A | 1/2004 |
| WO | 2014/155288 A2 | 10/2014 |
| WO | 2015/123775 A1 | 8/2015 |

OTHER PUBLICATIONS

Ayras et al., "Exit pupil expander with a large field of view based on diffractive optics," *Journal of the SID*, vol. 17, No. 8 (2009), pp. 659-664.

Chellappan et al., "Laser-based display: a review," *Applied Optics*, vol. 49, No. 25 (2010), pp. 79-98.

(56) References Cited

OTHER PUBLICATIONS

Cui et al., "Diffraction from angular multiplexing slanted volume hologram gratings," *Optik*, vol. 116 (2005), pp. 118-122.
Curatu et al., "Dual Purpose Lens for an Eye-tracked Projection Head-Mounted Display," *International Optical Design Conference 2006*, SPIE-OSA, vol. 6342 (2007), pp. 63420X-1-63420X-7.
Curatu et al., "Projection-based head-mounted display with eye-tracking capabilities," *Proc. of SPIE*, vol. 5875 (2005), pp. 58750J-1-58750J-9.
Essex, "Tutorial on Optomechanical Beam Steering Mechanisms," College of Optical Sciences, University of Arizona, 2006, 8 pages.
Fernandez et al., "Optimization of a thick polyvinyl alcohol-acrylamide photopolymer for data storage using a combination of angular and peristrophic holographic multiplexing," *Applied Optics*, vol. 45, No. 29 (2006), pp. 7661-7666.
Hainich et al., "Chapter 10: Near-Eye Displays," in: *Displays—Fundamentals & Applications*, 2011, pp. 439-503.
Hornstein et al., "Maradin's Micro-Minor—System Level Synchronization Notes," *SID 2012 Digest* (2012), pp. 981-984.
International Search Report and Written Opinion, dated Apr. 25, 2017, for International Application No. PCT/US2016/067246, 10 pages.
International Search Report and Written Opinion, dated Dec. 8, 2016, for International Application No. PCT/US2016/050225, 15 pages.
International Search Report and Written Opinion, dated Jan. 18, 2017, for International Application No. PCT/US2016/054852, 12 pages.
International Search Report and Written Opinion, dated Jun. 8, 2016, for International Application No. PCT/US2016/018293, 17 pages.
International Search Report and Written Opinion, dated Jun. 8, 2016, for International Application No. PCT/US2016/018298, 14 pages.
International Search Report and Written Opinion, dated Jun. 8, 2016, for International Application No. PCT/US2016/018299, 12 pages.
International Search Report and Written Opinion, dated Oct. 13, 2017, for International Application No. PCT/US2017/040323, 16 pages.
International Search Report and Written Opinion, dated Sep. 28, 2017, for International Application No. PCT/US2017/027479, 13 pages.
Itoh et al., "Interaction-free calibration for optical see-through head-mounted displays based on 3D eye localization," *2014 IEEE Symposium on 3D User Interfaces* (3DUI), (2014), pp. 75-82.
Janssen, "Radio Frequency (RF)" 2013, retrieved from https://web.archive.org/web/20130726153946/https://www.techopedia.com/definition/5083/radio-frequency-rf, retrieved on Jul. 12, 2017, 2 pages.
Kessler, "Optics of Near to Eye Displays (NEDs)," *Oasis 2013*, Tel Aviv, Israel, Feb. 19, 2013, 37 pages.
Kress et al., "A review of head-mounted displays (HMD) technologies and applications for consumer electronics," *Proc. of SPIE*, vol. 8720 (2013), pp. 87200A-1-87200A-13.
Kress et al., "Diffractive and Holographic Optics as Optical Combiners in Head Mounted Displays," *Proceedings of the 2013 ACM Conference on Pervasive and Ubiquitous Computing Adjunct Publication*, Zurich, Switzerland, Sep. 8-12, 2013, pp. 1479-1482.
Kress, "Optical architectures for see-through wearable displays," *Bay Area—SID Seminar*, Bay Area, Apr. 30, 2014, 156 pages.
Levola, "7.1: Invited Paper: Novel Diffractive Optical Components for Near to Eye Displays," *SID Symposium Digest of Technical Papers*, vol. 37, No. 1 (2006), pp. 64-67.
Liao et al., "The Evolution of MEMS Displays," *IEEE Transcations on Industrial Electronics*, vol. 56, No. 4 (2009), pp. 1057-1065.
Lippert, "Chapter 6: Display Devices: RSD (Retinal Scanning Display)," in: *The Avionics Handbook*, 2001, 8 pages.
Majaranta et al., "Chapter 3: Eye-Tracking and Eye-Based Human-Computer Interaction," in *Advances in Physiological Computing*, 2014, pp. 39-65.
Merriam-Webster, "Radio Frequencies" retrieved from https://www.merriam-webster.com/table/collegiate/radiofre.htm, retrieved on Jul. 12, 2017, 2 pages.
Schowengerdt et al., "Stereoscopic retinal scanning laser display with integrated focus cues for ocular accommodation," *Proc. of SPIE-IS&T Electronic Imaging*, vol. 5291 (2004), pp. 366-376.
Silverman et al., "58.5L: Late-News Paper: Engineering a Retinal Scanning Laser Display with Integrated Accommodative Depth Cues," *SID 03 Digest*, (2003), pp. 1538-1541.
Takatsuka et al., "Retinal projection display using diffractive optical element," *Tenth International Conference on Intelligent Information Hiding and Multimedia Signal Processing*, IEEE, (2014), pp. 403-406.
Urey et al., "Optical performance requirements for MEMS-scanner based microdisplays," *Conf. on MOEMS and Miniaturized Systems*, SPIE, vol. 4178 (2000), pp. 176-185.
Urey, "Diffractive exit-pupil expander for display applications," *Applied Optics*, vol. 40, No. 32 (2001), pp. 5840-5851.
Viirre et al., "The Virtual Retina Display: A New Technology for Virtual Reality and Augmented Vision in Medicine," *Proc. of Medicine Meets Virtual Reality* (1998), pp. 252-257.

\* cited by examiner

SYSTEMS, DEVICES, AND METHODS FOR ASTIGMATISM COMPENSATION IN A WEARABLE HEADS-UP DISPLAY

TECHNICAL FIELD

The present systems, devices, and methods generally relate to wearable heads-up displays and particularly relate to shaping the laser light output by laser projectors to prevent image astigmatism in wearable heads-up displays.

BACKGROUND

Description of the Related Art

Laser Projectors

A projector is an optical device that projects or shines a pattern of light onto another object (e.g., onto a surface of another object, such as onto a projection screen) in order to display an image or video on that other object. A projector necessarily includes a light source, and a laser projector is a projector for which the light source comprises at least one laser. The at least one laser is temporally modulated to provide a pattern of laser light and usually at least one controllable mirror is used to spatially distribute the modulated pattern of laser light over a two-dimensional area of another object. The spatial distribution of the modulated pattern of laser light produces an image at or on the other object. In conventional laser projectors, the at least one controllable mirror may include: a single digital micromirror (e.g., a microelectromechanical system ("MEMS") based digital micromirror) that is controllably rotatable or deformable in two dimensions, or two digital micromirrors that are each controllably rotatable or deformable about a respective dimension, or a digital light processing ("DLP") chip comprising an array of digital micromirrors.

In a conventional laser projector comprising a RGB laser module with a red laser diode, a green laser diode, and a blue laser diode, each respective laser diode has a corresponding respective focusing lens. The relative positions of the laser diodes, the focusing lenses, and the at least one controllable mirror are all tuned and aligned so that each laser beam impinges on the at least one controllable mirror with substantially the same spot size and with substantially the same rate of convergence (so that all laser beams will continue to have substantially the same spot size as they propagate away from the laser projector towards, e.g., a projection screen). In a conventional laser projector, it is usually possible to come up with such a configuration for all these elements because the overall form factor of the device is not a primary design consideration. However, in applications for which the form factor of the laser projector is an important design element, it can be very challenging to find a configuration for the laser diodes, the focusing lenses, and the at least one controllable mirror that sufficiently aligns the laser beams (at least in terms of spot size, spot position, and rate of convergence) while satisfying the form factor constraints.

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

BRIEF SUMMARY

A wearable heads-up display ("WHUD") may be summarized as including: a support structure that in use is worn on a head of a user; a transparent combiner carried by the support structure, wherein the transparent combiner is positioned within a field of view of an eye of the user when the support structure is worn on the head of the user; a laser projector carried by the support structure, the laser projector comprising: at least one laser diode to generate laser light; at least one controllable mirror positioned to receive the laser light from the at least one laser diode and controllably orientable to redirect the laser light towards the transparent combiner; and at least one anamorphic optical element positioned in an optical path of the laser light in between the at least one laser diode and the transparent combiner, the at least one anamorphic optical element oriented to shape a spot of the laser light to compensate for an astigmatic effect of at least the transparent combiner on the laser light. The transparent combiner may include at least one holographic optical element. The at least one anamorphic optical element may be positioned in the optical path of the laser light in between the at least one laser diode and the at least one controllable mirror.

The laser projector may further include: a beam combiner positioned in the optical path of the laser light in between the at least one laser diode and the at least one controllable mirror, wherein the at least one laser diode includes a red laser diode, a green laser diode, and a blue laser diode, and wherein the beam combiner is oriented to combine red laser light from the red laser diode, green laser light from the green laser diode, and blue laser light from the blue laser diode into an aggregate laser beam. The at least one anamorphic optical element may include: a first anamorphic optical element positioned in an optical path of red laser light in between the red laser diode and the beam combiner to shape a spot of the red laser light; a second anamorphic optical element positioned in an optical path of green laser light in between the green laser diode and the beam combiner to shape a spot of the green laser light; and a third anamorphic optical element positioned in an optical path of blue laser light in between the blue laser diode and the beam combiner to shape a spot of the blue laser light. The at least one anamorphic optical element may be positioned in an optical path of the aggregate laser beam in between the beam combiner and the at least one controllable mirror to shape a spot of the aggregate laser beam.

The at least one anamorphic optical element may include at least one prism pair or at least one cylindrical lens.

The support structure may have a general shape and appearance of an eyeglasses frame and the transparent combiner may be carried by an eyeglass lens.

In use, the astigmatic effect of the transparent combiner may cause a shape of the spot of the laser light to change on at least one axis, and the at least one anamorphic optical element may be oriented to change the shape of the spot of the laser light on the at least one axis in order to compensate for the astigmatic effect of the transparent combiner on the laser light.

A method of operating a wearable heads-up display, wherein the wearable heads-up display includes a transparent combiner that positions within a field of view of an eye of a user when the wearable heads-up display is worn on a head of the user, may be summarized as including: generating laser light by at least one laser diode; shaping a spot of the laser light by at least one anamorphic optical element to compensate for an astigmatic effect of at least the transparent combiner on the laser light; scanning the laser light over the transparent combiner by at least one controllable mirror; and redirecting the laser light towards the eye of the user by the transparent combiner. Shaping the spot of the laser light by the at least one anamorphic optical element to compensate for an astigmatic effect of at least the transparent combiner on the laser light may include anamorphically shaping the spot of the laser light to a non-circular spot shape by the at least one anamorphic optical element; and redirecting the laser light towards the eye of the user by the transparent combiner may include applying the astigmatic effect to the laser light by the transparent combiner. Applying the astigmatic effect to the laser light by the transparent combiner may include re-shaping the spot of the laser light to an at least approximately circular spot shape by the transparent combiner.

The transparent combiner may include at least one holographic optical element, and scanning the laser light over the transparent combiner by at least one controllable mirror may include scanning the laser light over the at least one holographic optical element by the at least one controllable mirror; and redirecting the laser light towards the eye of the user by the transparent combiner may include redirecting the laser light towards the eye of the user by the at least one holographic optical element.

The at least one laser diode may include a red laser diode, a green laser diode, and a blue laser diode, wherein generating laser light by the at least one laser diode includes generating red laser light by the red laser diode, generating green laser light by the green laser diode, and generating blue laser light by the blue laser diode; and the method further includes combining the red laser light, the green laser light, and the blue laser light into an aggregate laser beam by a beam combiner. The at least one anamorphic optical element may be positioned in between the beam combiner and the at least one controllable mirror in an optical path of the aggregate laser beam, wherein: shaping the spot of the laser light by the at least one anamorphic optical element to compensate for an astigmatic effect of the transparent combiner on the laser light includes shaping a spot of the aggregate laser beam by the at least one anamorphic optical element to compensate for an astigmatic effect of at least the transparent combiner on the aggregate laser beam. A first anamorphic optical element may be positioned in an optical path of the red laser light in between the red laser diode and the beam combiner, a second anamorphic optical element may be positioned in an optical path of the green laser light in between the green laser diode and the beam combiner, and a third anamorphic optical element may be positioned in an optical path of the blue laser light in between the blue laser diode and the beam combiner, wherein: shaping the spot of the laser light by the at least one anamorphic optical element includes shaping a spot of the red laser light by the first anamorphic optical element, shaping a spot of the green laser light by the second anamorphic optical element, and shaping a spot of the blue laser light by the third anamorphic optical element.

The at least one anamorphic optical element may include at least one prism pair, wherein shaping the spot of the laser light by the at least one anamorphic optical element includes anamorphically shaping the spot of the laser light by the at least one prism pair.

The at least one anamorphic optical element may include at least one cylindrical lens, wherein shaping the spot of the laser light by the at least one anamorphic optical element includes anamorphically shaping the spot of the laser light by the at least one cylindrical lens.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for astigmatism compensation and are particularly well-suited for use in wearable heads-up displays.

Figure 1:
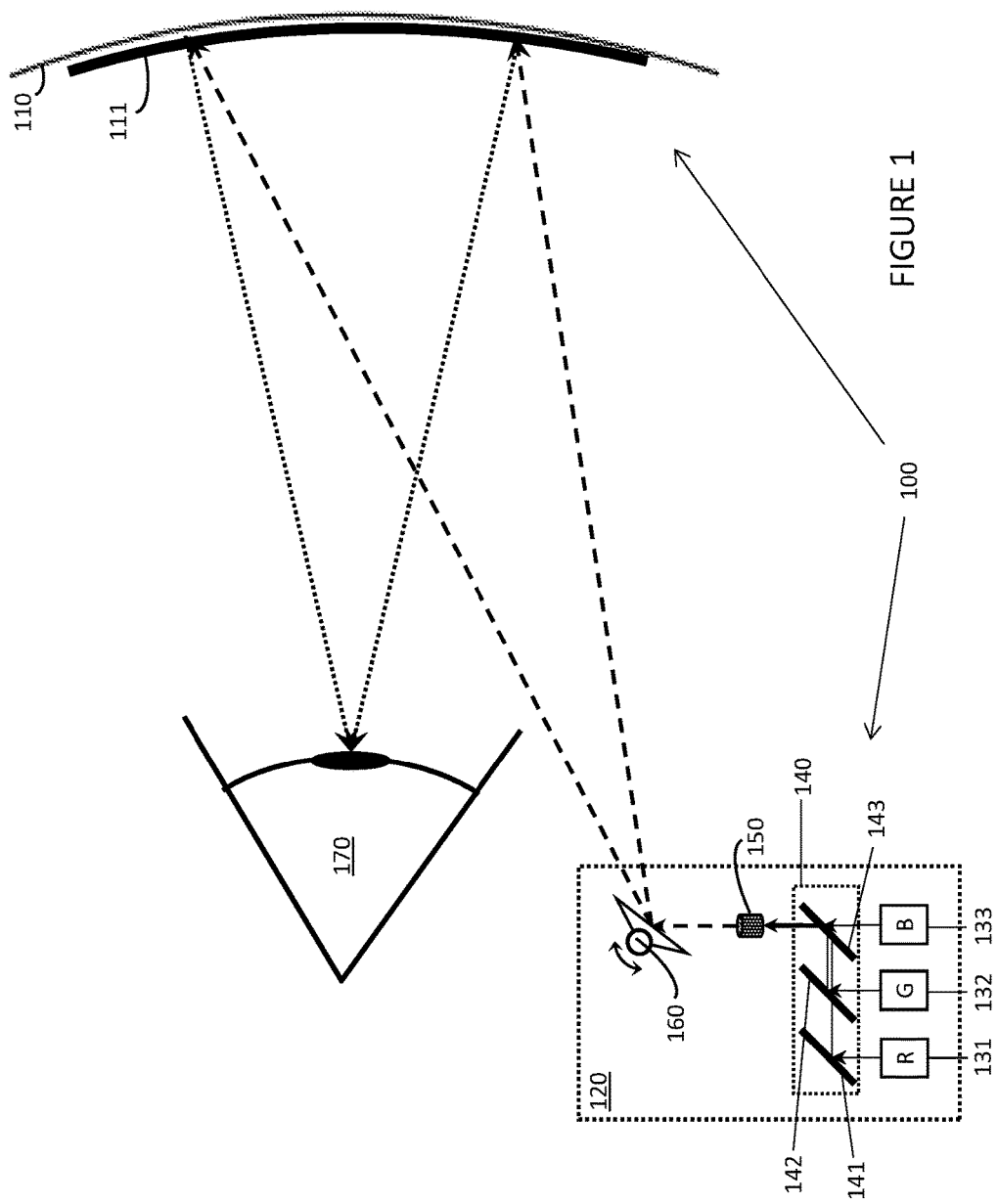
FIG. 1 is a schematic diagram of a wearable heads-up display with a laser projector with astigmatism compensation, and a transparent combiner in a field of view of an eye of a user in accordance with the present systems, devices, and methods.

FIG. 1 is a schematic diagram of a wearable heads-up display 100 with a laser projector 120 with astigmatism compensation, and a transparent combiner 111 in a field of view of an eye 170 of a user in accordance with the present systems, devices, and methods. WHUD 100 includes a support structure, with the general shape and appearance of an eyeglasses frame, carrying an eyeglass lens 110 with a transparent combiner 111, and a laser projector 120. Laser projector 120 includes laser diodes 131, 132, and 133, a beam combiner 140 including optical elements 141, 142, and 143, an anamorphic optical element 150, and a controllable mirror 160. WHUD 100 positions within a field of view of the user when worn on the head of the user.

Throughout this specification and the appended claims, the term "carries" and variants such as "carried by" or "carrying" are generally used to refer to a physical coupling between two objects. The physical coupling may be direct physical coupling (i.e., with direct physical contact between the two objects) or indirect physical coupling mediated by one or more additional objects. Thus the term carries and variants such as "carried by" are meant to generally encompass all manner of direct and indirect physical coupling.

Exemplary wearable heads-up display 100 operates as follows. Laser diodes 131, 132, and 133 of laser projector 120 generate laser light having a "spot". The laser light "spot", or variants such as "spot shape" refers to the cross-sectional area of the laser light at any point, and includes both the size and the geometric shape of the area. In exemplary WHUD 100, laser diode 131 is a red laser diode that generates red laser light, laser diode 132 is a green laser diode that generates green laser light, and laser diode 133 is a blue laser diode that generates blue laser light. The output of light from the laser diodes may be modulated via signals produced by a processor (e.g. microprocessor, field programmable gate array, application specific integrated circuit, programmable logic controller or other hardware circuitry), and the processor may be communicatively coupled to a non-transitory processor-readable storage medium (e.g., volatile memory such as Random Access Memory (RAM), memory caches, processor registers; nonvolatile memory such as Read Only Memory, EEPROM, Flash memory, magnetic disks, optical disks) that stores processor-executable data and/or instructions. In other implementations, the number, type, and output wavelength of light sources may be different. The red laser light, green laser light, and blue laser light are directed towards beam combiner 140. Beam combiner 140 includes three optical elements 141, 142, and 143. The red laser light is directed towards optical element 141. Optical element 141 is a mirror that reflects the red laser light towards optical element 142. The green laser light is directed towards optical element 142. Optical element 142 is a dichroic mirror that is transmissive of the red laser light and reflective of the green laser light. The red laser light and green laser light are combined by optical element 142 and directed towards optical element 143. The blue laser light is directed towards optical element 143. Optical element 143 is a dichroic mirror that is transmissive of the blue laser light and reflective of the red laser light and the green laser light.

Optical element 143 combines the red laser light, green laser light, and blue laser light into an aggregate beam and directs the aggregate beam towards anamorphic optical element 150.

The aggregate beam incident on anamorphic optical element 150 may have a spot shape that would result in an astigmatic image at the eye of the user if not re-shaped by anamorphic optical element 150. Astigmatism occurs when rays of light within the same beam but on orthogonal axes have different rates of convergence. Light on one of the axes will be focused in front or behind the light on the other axis resulting in an unfocused image. For example, the laser light at the eye may have an elliptical shape wherein the width of the light on the horizontal axis may be greater than the height of the light on the vertical axis or vice versa, resulting in the light on the horizontal axis focusing relatively behind the light on the vertical axis. Such an elliptical laser light shape, when viewed by a user, would result in astigmatism of the image, while a circular laser light shape at the eye of the user does not result in astigmatism (if the eye itself is not astigmatic). An anamorphic optical element magnifies light unequally on orthogonal axes, therefore, after light passes through an anamorphic optical element, the spot of the light is re-shaped in a non-uniform manner. For example, if the original laser light shape was an ellipse 1.0 mm wide and 0.2 mm high, an anamorphic optical element may alter this by magnifying the laser light on the horizontal axis by a factor of one and the laser light on the vertical axis by a factor of five to achieve an approximately circular laser light shape 1.0 mm wide and 1.0 mm high. A person of skill in the art will appreciate that depending on the specific architecture of the WHUD (e.g., location of the projector, optical characteristics of projector components, etc.) the shape of laser light output from the at least one anamorphic optical element may not be circular. For example, an optical element downstream of an anamorphic optical element in the optical path of laser light may have an astigmatic effect on the laser light and, the anamorphic optical element may shape the spot of the laser light to a non-circular spot shape that compensates for the astigmatic effect of that optical element.

In FIG. 1, the aggregate beam passes through anamorphic optical element 150 and is magnified unequally on orthogonal axes, resulting in a compensatory shape of the laser spot. The aggregate beam is directed towards controllable mirror 160. Anamorphic optical element 150 may be at least one prism pair or at least one cylindrical lens. In another embodiment, a prism pair or a cylindrical lens could be present immediately after each laser diode and before the beam combiner in the optical path of the laser light instead of having one prism pair or cylindrical lens after the beam combiner in the optical path of the aggregate beam. That is, a first anamorphic optical element could be located in the path of the red laser light between red laser diode 131 and optical element 141 to shape the red laser light, a second anamorphic optical element could be located in the path of the green laser light between green laser diode 132 and optical element 142 to shape the green laser light, and a third anamorphic optical element could be located in the path of the blue laser light between blue laser diode 133 and optical element 143 to shape the blue laser light.

Controllable mirror 160 scans the laser light onto transparent combiner 111 carried by eyeglass lens 110. Controllable mirror 160 may be a single bi-axial scan mirror or two single-axis scan mirrors may be used to scan the laser light onto transparent combiner 111. Transparent combiner 111 may be a holographic combiner with at least one holographic optical element. Eyeglass lens 110 may be a nonprescription or prescription lens. Transparent combiner 111 has an astigmatic effect and anamorphically shapes the spot of the laser light on at least one axis. Anamorphic optical element 150 compensates for this astigmatic effect by anamorphically shaping the spot on the same axis (or axes) as transparent combiner 111. Transparent combiner 111 redirects the laser light towards a field of view of eye 170 of the user. Because the spot of the laser light has been shaped by anamorphic optical element 150 to compensate for the astigmatic effect of transparent combiner 111, the laser light redirected from the transparent combiner will have an at least approximately circular spot shape. A person of skill in the art will appreciate that the required precision of the circular shape of the spot would depend on the specific architecture of the wearable-heads up display, however, an exemplary measurement may be that any diameter of the beam be within five percent of a given or nominal length or dimension. The laser light redirected towards eye 170 of the user may be collimated by the transparent combiner, wherein the spot at transparent combiner 111 is approximately the same size and shape as the spot at eye 170 of the user. The laser light is converged by eye 170 to a focal point at the retina of eye 170 and creates an image that is focused and has no astigmatism. A person of skill in the art will appreciate that WHUD 100 optical elements other than transparent combiner 111 may have an astigmatic effect on the laser light and that shaping of the spot of the laser light by anamorphic optical element 150 compensates for the net laser light astigmatism. That is, anamorphic optical element 150 shapes the spot of the laser light to compensate for the shape of the laser light that would be redirected from transparent combiner 111 to eye 170 in the absence of anamorphic optical element 150, and not to compensate solely for the astigmatic effect of transparent combiner 111 on the laser light. A person of skill in the art will also appreciate that the optical function of an anamorphic optical element is fixed and therefore the net astigmatic effect of the optical elements of the wearable heads-up display on the laser light must be known to determine the required anamorphic optical element.

Figure 2:
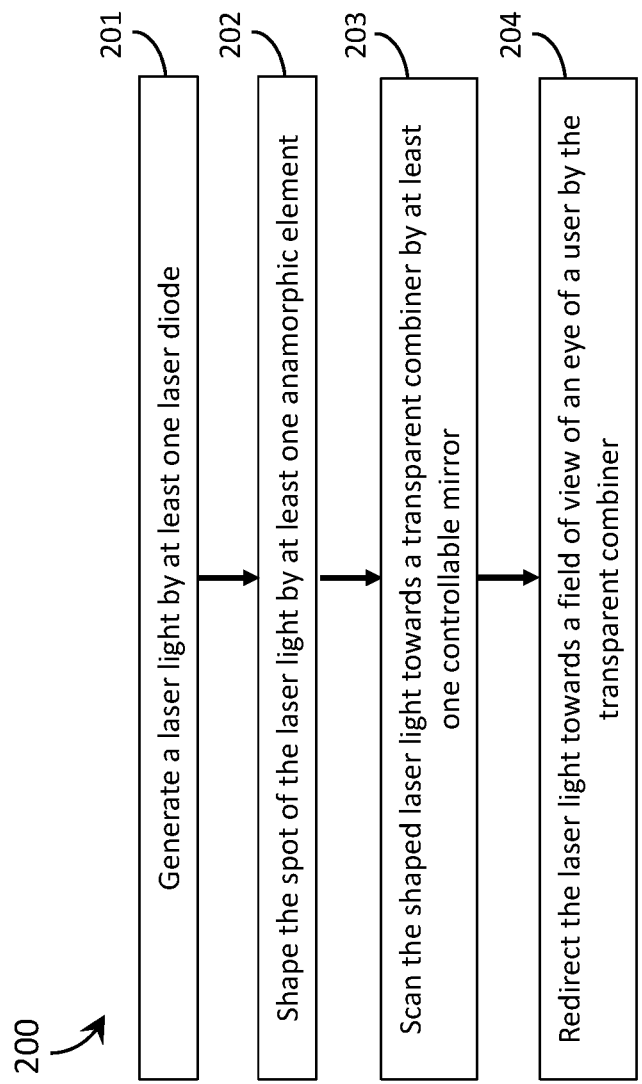
FIG. 2 is a flow diagram that shows a method of operating a wearable heads-up display with a laser projector with astigmatism compensation in accordance with the present systems, devices, and methods.

FIG. 2 shows a method 200 of operating a wearable heads-up display with a laser projector with astigmatism compensation in accordance with the present systems, devices, and methods. The WHUD of FIG. 2 may be substantially similar to WHUD 100 of FIG. 1 and generally includes a support structure carrying: a laser projector comprising at least one laser diode, an anamorphic optical element, and a controllable mirror, and a transparent combiner carried by an eyeglass lens. Method 200 includes acts 201, 202, 203, and 204, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 201, the at least one laser diode generates a laser light that, without shaping of the spot by the anamorphic optical element, would result in astigmatism of the image output by the WHUD. The laser diode may be communicatively coupled to a processor which modulates the generation of laser light by the at least one laser diode via control signals. The at least one laser diode may include a red laser diode to generate red laser light, a green laser diode to generate green laser light, and a blue laser diode to generate blue laser light, wherein the laser projector also includes a beam combiner to combine the red laser light, green laser light, and blue laser light into an aggregate beam.

At 202, the spot of the laser light is shaped by the at least one anamorphic optical element. The at least one anamorphic optical element magnifies the laser light unequally on orthogonal axes as discussed above. The anamorphic optical element shapes the spot to compensate for astigmatic effects from at least the transparent combiner, but may compensate for astigmatic effects from any and all optical elements of the WHUD, both upstream and downstream of the anamorphic optical element. If the only source of astigmatic effect is the transparent combiner, the anamorphic optical element may shape the laser light spot to a non-circular shape. If other WHUD optical elements are sources of astigmatic effects then the shaped laser light spot may be non-circular or circular depending on the locations and specific astigmatic effect of each optical element. That is, if elements in the optical path of the laser light beyond the anamorphic optical element (e.g., the transparent combiner) have a net astigmatic effect, the spot shape output from the anamorphic optical element would be non-circular to compensate, but if net astigmatic effect of the WHUD optical elements (including the transparent combiner) in the optical path of the laser light beyond the anamorphic optical element is zero, the second spot shape would be circular. In an embodiment where the laser projector includes a red laser diode to generate red laser light, a green laser diode to generate green laser light, a blue laser diode to generate blue laser light, and a beam combiner to combine the laser light into an aggregate beam, the at least one anamorphic optical element may be a single anamorphic optical element located in the path of the aggregate beam after the beam combiner and before the controllable mirror, or the at least one anamorphic optical element may include a first anamorphic optical element located in the path of the laser light between the red laser diode and the beam combiner to shape the red laser spot, a second anamorphic optical element in the path of the laser light between the green laser diode and the beam combiner to shape the green laser spot, and a third anamorphic optical element in the path of the laser light between the blue laser diode and the beam combiner to shape the blue laser spot. In any implementation the at least one anamorphic optical element may be at least one prism pair or at least one cylindrical lens.

At 203, the shaped laser light is scanned over the transparent combiner by the at least one controllable mirror. The at least one controllable mirror may be a single bi-axial scan mirror or two single-axis orthogonal scan mirrors.

At 204, the laser light is directed towards a field of view of an eye of a user by the transparent combiner. The transparent combiner directs the light to an exit pupil at the eye of the user. The transparent combiner may be a holographic combiner including at least one holographic optical element. As mentioned above, the anamorphic optical element shapes the laser light spot to compensate for at least the astigmatic effect of the transparent combiner. The transparent combiner anamorphically shapes the spot of the laser light to have an at least approximately circular shape. The transparent combiner may collimate the laser light such that the laser spot at the eye of the user is approximately the same size and shape as the laser spot at the transparent combiner. The shaped laser light directed towards the field of view of the eye of the user will result in a non-astigmatic image at the eye of the user.

Figure 3:
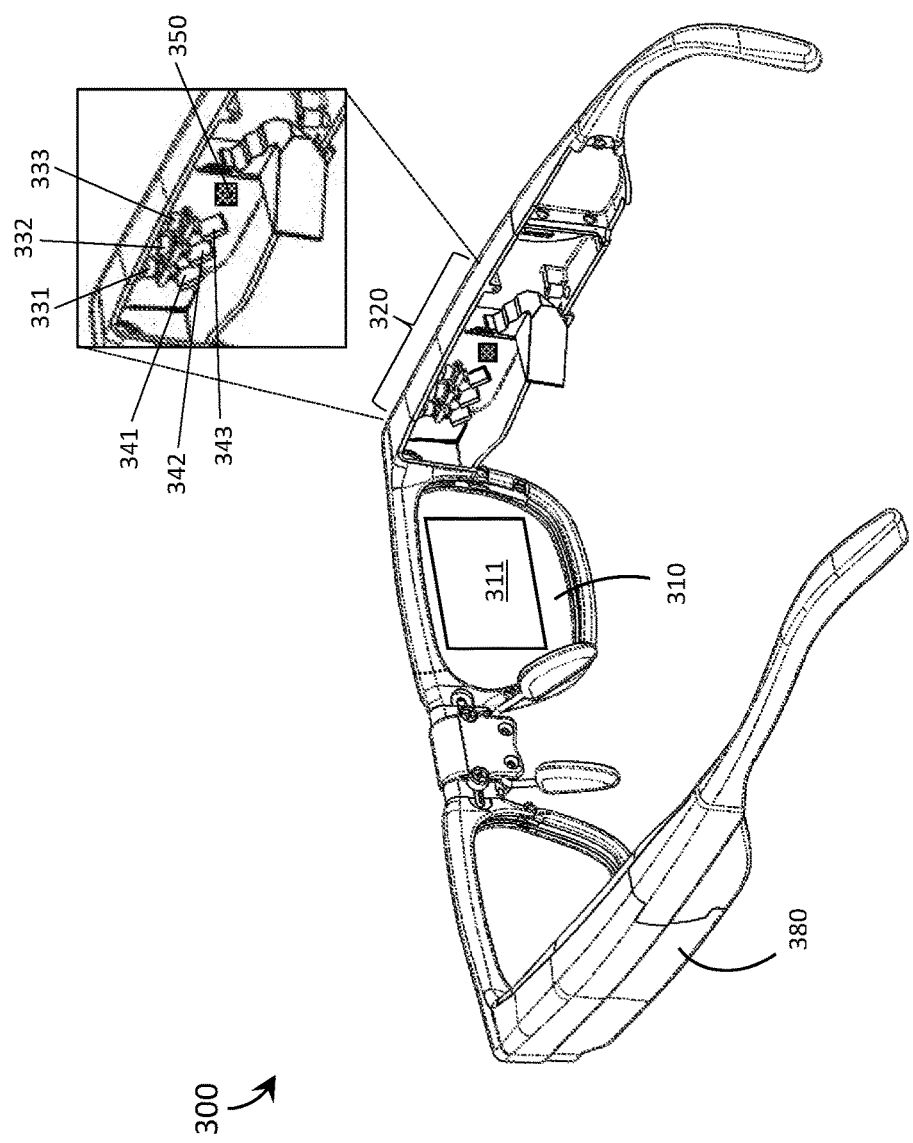
FIG. 3 is an isometric view of a wearable heads-up display with a laser projector with astigmatism compensation in accordance with the present systems, devices, and methods.

FIG. 3 is an isometric view of a wearable heads-up display 300 with a laser projector 320 with astigmatism compensation in accordance with the present systems, devices, and methods. WHUD 300 includes a support structure 380 that in use is worn on the head of the user and has a general shape and appearance of an eyeglasses frame. Support structure 380 carries multiple components, including an eyeglass lens 310, a transparent combiner 311, and a laser projector 320. Laser projector 320 includes (blow-out) laser diodes 331, 332, and 333, a beam combiner, and an anamorphic optical element 350. The beam combiner includes optical elements 341, 342, and 343. WHUD 300 operates in generally the same manner as WHUD 100 from FIG. 1.

Laser diodes 331, 332, and 333 generate laser light. As in FIG. 1, red laser diode 331 generates red laser light, green laser diode 332 generates green laser light, and blue laser diode 333 generates blue laser light. The red laser light is directed towards optical element 341, a mirror, which reflects the red laser light towards optical element 342. The green laser light is directed towards optical element 342. Optical element 342 is a dichroic mirror that is transmissive to the red laser light and reflective to the green laser light and directs combined red and green light towards optical element 343. The blue laser light is directed towards optical element 343. Optical element 343 is a dichroic mirror which is reflective to the red laser light and green laser light and transmissive to the blue laser light. Optical element 343 combines the red laser light, green laser light, and blue laser light into an aggregate beam and directs the aggregate beam towards anamorphic optical element 350. Anamorphic optical element 350 receives and anamorphically shapes the aggregate beam. The spot is shaped to compensate for astigmatic effects from at least transparent combiner 311. The anamorphic optical element may be at least one prism pair or at least one cylindrical lens. The aggregate beam is then directed toward transparent combiner 311 by at least one controllable mirror (not shown in FIG. 3). The at least one controllable mirror may be a single bi-axial scan mirror or may be two single-axis scan mirrors. The spot of the aggregate beam is anamorphically shaped by transparent combiner 311 to a circular shape. The aggregate beam is directed towards a field of view of an eye of a user by transparent combiner 311. Transparent combiner 311 collimates the aggregate beam such that the spot of the laser light incident on the eye of the user is at least approximately the same size and shape as the spot at transparent combiner 311. The transparent combiner may be a holographic combiner that includes at least one holographic optical element, and the holographic optical element may have an astigmatic effect.

A person of skill in the art will appreciate that the various embodiments for astigmatism compensation described herein may be applied in non-WHUD applications. For example, the present systems, devices, and methods may be applied in non-wearable heads-up displays and/or in other applications that may or may not include a visible display.

In some implementations, one or more optical fiber(s) may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060, all of which are incorporated by reference herein in their entirety.

Throughout this specification and the appended claims, the term "processor" is used. Generally, "processor" refers to hardware circuitry, in particular any of microprocessors, microcontrollers, application specific integrated circuits (ASICs), digital signal processors (DSPs), programmable gate arrays (PGAs), and/or programmable logic controllers (PLCs), or any other integrated or non-integrated circuit that perform logic operations.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: US Patent Application Publication No. US 2015-0378161 A1, U.S. Non-Provisional patent application Ser. No. 15/046,234, U.S. Non-Provisional patent application Ser. No. 15/046,254, US Patent Application Publication No. US 2016-0238845 A1, U.S. Non-Provisional patent application Ser. No. 15/145,576, U.S. Non-Provisional patent application Ser. No. 15/145,609, U.S. Non-Provisional patent application Ser. No. 15/145,583, U.S. Non-Provisional patent application Ser. No. 15/256,148, U.S. Non-Provisional patent application Ser. No. 15/167,458, U.S. Non-Provisional patent application Ser. No. 15/167,472, U.S. Non-Provisional patent application Ser. No. 15/167,484, U.S. Provisional Patent Application Ser. No. 62/271,135, U.S. Non-Provisional patent application Ser. No. 15/331,204, US Patent Application Publication No. US 2014-0198034 A1, US Patent Application Publication No. US 2014-0198035 A1, U.S. Non-Provisional patent application Ser. No. 15/282,535, U.S. Provisional Patent Application Ser. No. 62/268,892, U.S. Provisional Patent Application Ser. No. 62/322,128, U.S. Provisional Patent Application Ser. No. 62/420,371, U.S. Provisional Patent Application Ser. No. 62/420,368 and U.S. Provisional Patent Application Ser. No. 62/420,380, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a wearable heads-up display, wherein the wearable heads-up display includes a transparent combiner that positions within a field of view of an eye of a user when the wearable heads-up display is worn on a head of the user, the method comprising:
generating laser light by at least one laser diode;
anamorphically shaping a spot of the laser light to a non-circular spot shape by at least one anamorphic optical element in order to compensate for an astigmatic effect of at least the transparent combiner on the laser light;
scanning the laser light over the transparent combiner by at least one controllable mirror; and
redirecting the laser light towards the eye of the user by the transparent combiner, wherein redirecting the laser light towards the eye of the user by the transparent combiner includes re-shaping the spot of the laser light to an at least approximately circular spot shape by the transparent combiner.

2. The method of claim 1 wherein the transparent combiner includes at least one holographic optical element, and wherein:
scanning the laser light over the transparent combiner by at least one controllable mirror includes scanning the laser light over the at least one holographic optical element by the at least one controllable mirror; and
redirecting the laser light towards the eye of the user by the transparent combiner includes redirecting the laser light towards the eye of the user by the at least one holographic optical element.

3. The method of claim 1 wherein the at least one laser diode includes a red laser diode, a green laser diode, and a blue laser diode, and wherein:
generating laser light by the at least one laser diode includes generating red laser light by the red laser diode, generating green laser light by the green laser diode, and generating blue laser light by the blue laser diode; and
the method further comprising:
combining the red laser light, the green laser light, and the blue laser light into an aggregate laser beam by a beam combiner.

4. The method of claim 3 wherein the at least one anamorphic optical element is positioned in between the beam combiner and the at least one controllable mirror in an optical path of the aggregate laser beam, and wherein:

anamorphically shaping the spot of the laser light to a non-circular spot shape by the at least one anamorphic optical element in order to compensate for an astigmatic effect of the transparent combiner on the laser light includes anamorphically shaping a spot of the aggregate laser beam to a non-circular spot shape by the at least one anamorphic optical element in order to compensate for an astigmatic effect of at least the transparent combiner on the aggregate laser beam.

5. The method of claim 3 wherein a first anamorphic optical element is positioned in an optical path of the red laser light in between the red laser diode and the beam combiner, a second anamorphic optical element is positioned in an optical path of the green laser light in between the green laser diode and the beam combiner, and a third anamorphic optical element is positioned in an optical path of the blue laser light in between the blue laser diode and the beam combiner, and wherein:

anamorphically shaping the spot of the laser light to a non-circular spot shape by the at least one anamorphic optical element includes: anamorphically shaping a spot of the red laser light to a non-circular spot shape by the first anamorphic optical element, anamorphically shaping a spot of the green laser light to a non-circular spot shape by the second anamorphic optical element, and anamorphically shaping a spot of the blue laser light to a non-circular spot shape by the third anamorphic optical element.

6. The method of claim 1 wherein the at least one anamorphic optical element includes at least one prism pair, and wherein:

anamorphically shaping the spot of the laser light to a non-circular spot shape by the at least one anamorphic optical element includes anamorphically shaping the spot of the laser light to a non-circular spot shape by the at least one prism pair.

7. The method of claim 1 wherein the at least one anamorphic optical element includes at least one cylindrical lens, and wherein:

anamorphically shaping the spot of the laser light to a non-circular spot shape by the at least one anamorphic optical element includes anamorphically shaping the spot of the laser light to a non-circular spot shape by the at least one cylindrical lens.

* * * * *